United States Patent
Yehoshua et al.

(10) Patent No.: US 10,713,005 B2
(45) Date of Patent: Jul. 14, 2020

(54) MULTIMODAL STATE CIRCULATION

(71) Applicant: Google LLC, Mountain View, CA (US)

(72) Inventors: Shir Judith Yehoshua, San Francisco, CA (US); David Kliger Elson, Brooklyn, NY (US); David P. Whipp, San Jose, CA (US)

(73) Assignee: Google LLC, Mountain View, CA (US)

( * ) Notice: Subject to any disclaimer, the term of this patent is extended or adjusted under 35 U.S.C. 154(b) by 542 days.

(21) Appl. No.: 14/988,494

(22) Filed: Jan. 5, 2016

(65) Prior Publication Data

US 2016/0196110 A1    Jul. 7, 2016

Related U.S. Application Data (60) Provisional application No. 62/099,903, filed on Jan. 5, 2015.

(51) Int. Cl.
*G06F 3/048* (2013.01)
*G06F 3/16* (2006.01)
(Continued)

(52) U.S. Cl.
CPC .............. *G06F 3/167* (2013.01); *G10L 15/22* (2013.01); *H04M 3/4936* (2013.01); *G10L 2015/223* (2013.01); *H04M 2250/74* (2013.01)

(58) Field of Classification Search
CPC ......... G10L 15/22; G10L 15/18; G10L 15/26; G10L 15/24; G10L 21/06; G10L 2015/223; G10L 13/00; G10L 2015/225; G10L 2015/226; G06F 3/167; G06F 17/28; G06F 17/30654; G06F 2203/0381;
(Continued)

(56) References Cited

U.S. PATENT DOCUMENTS 7,149,287 B1   12/2006   Burger et al.
7,478,171 B2   1/2009    Ramaswamy et al.
(Continued)

FOREIGN PATENT DOCUMENTS

CN    103226949       7/2013
WO    2006/036328     4/2006
(Continued)

OTHER PUBLICATIONS

International Preliminary Report on Patentability issued in International Application No. PCT/US2016/012172, dated Jul. 11, 2017, 11 pages.
(Continued)

*Primary Examiner* — Phuong H Nguyen
(74) *Attorney, Agent, or Firm* — Fish & Richardson P.C.

(57) ABSTRACT

Methods, systems, and apparatus, including computer programs encoded on a computer storage medium, for managing dialogs. In one aspect, a method includes receiving a request to perform a task from a user device; obtaining a dialog corresponding to the task; providing multiple protocol buffers to the user device; receiving a voice input and one or more annotated protocol buffers from the user device, the one or more annotated protocol buffers identifying corresponding non-verbal responses to content in the protocol buffers; and using the received protocol buffers to update a state of the dialog and to interpret the voice input.

20 Claims, 3 Drawing Sheets

(51) Int. Cl.
*H04M 3/493* (2006.01)
*G10L 15/22* (2006.01)

(58) Field of Classification Search
CPC .......... G06F 17/30026; G06F 17/3074; H04M 2250/74; H04M 3/4936
See application file for complete search history.

(56) References Cited

U.S. PATENT DOCUMENTS

| | | | |
|---|---|---|---|
| 2003/0225825 A1 | 12/2003 | Healey et al. | |
| 2011/0258543 A1* | 10/2011 | Larsson | G06F 3/038 715/702 |
| 2013/0275899 A1* | 10/2013 | Schubert | G06F 3/0481 715/765 |
| 2015/0019227 A1* | 1/2015 | Anandarajah | G10L 15/22 704/257 |

FOREIGN PATENT DOCUMENTS

| | | |
|---|---|---|
| WO | WO 2010/049514 | 8/2010 |
| WO | 2011/115932 | 9/2011 |
| WO | 2012/135229 | 10/2012 |
| WO | 2013/010844 | 1/2013 |
| WO | WO 2013/170383 | 11/2013 |

OTHER PUBLICATIONS

Bui, "Multimodal Dialogue Management—State of the art," Jan. 3, 2006, Technical Report TR-CTIT-06-01, Centre for Telematics and Information Technology University of Twente, 24 pages, XP055263042.
International Search Report and Written Opinion in International Application No. PCT/US2016/012172, dated May 2, 2016, 16 pages.
Salonen et al., "Distributed Dialogue Management for Smart Terminal Devices," 9th European Conference on Speech Communication and Technology, Sep. 4, 2005, 4 pages, XP055260824.
Seide et al., "ClippyScript: A Programming Language for Multi-Domain Dialogue Systems," Proc. INTERSPEECH 2012, Sep. 9, 2012, pp. 242-245, XP055260707.
EP Office Action issued in European Application No. 16700781.4, dated Nov. 22, 2018, 6 pages.
CN Office Action and Search Report in Chinese Application No. 201680005026, dated Jan. 20, 2020, 26 pages (with English translation).

* cited by examiner

FIG. 3

MULTIMODAL STATE CIRCULATION

CROSS-REFERENCE TO RELATED APPLICATIONS

This application claims the benefit under 35 U.S.C. §119(e) of the filing date of U.S. Provisional Patent Application No. 62/099,903, for "Multimodal State Circulation," which was filed on Jan. 5, 2015, and which is incorporated here by reference.

BACKGROUND

This specification relates to dialogs.

Conventional mobile devices can include software to respond to speech of a user of the mobile device. The speech can typically include instructions to the mobile device to call a phone number, text a phone number, or search for information on the mobile device or the Internet. The software can provide audio output from the mobile device confirming the instructions, or can ask for clarifying information to complete an instruction. The mobile device can provide the received speech to a server system for processing, and receive information identifying operations to perform.

SUMMARY

In general, one innovative aspect of the subject matter described in this specification can be embodied in methods that include the actions of receiving a request to perform a task from a user device; obtaining a dialog corresponding to the task; providing multiple protocol buffers to the user device; receiving a voice input and one or more annotated protocol buffers from the user device, the one or more annotated protocol buffers identifying corresponding non-verbal responses to content in the protocol buffers; and using the received protocol buffers to update a state of the dialog and to interpret the voice input. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Each protocol buffer is a DialogTurnIntent (DTI). The received protocol buffers identify an order of questions and non-verbal responses. The order of responses is used to provide context to interpret the voice input. The method includes providing one or more additional protocol buffers to the user device in response to updating the state of the dialog following the voice input. The multiple protocol buffers encompass the entire dialog for the task. The method includes completing the task once the dialog values are determined.

In general, one innovative aspect of the subject matter described in this specification can be embodied in methods that include the actions of receiving a user input to perform a task; providing the voice input to a dialog system; receiving multiple protocol buffers for the dialog; presenting a first prompt for a first protocol buffer to the user; receiving a non-verbal response to the first prompt; updating a state of the dialog with the response and presenting a second prompt for a next protocol buffer to the user; receiving a voice input in response to the second prompt; and providing the voice input and the first and second protocol buffers to the dialog system. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The multiple DTIs are received as part of a resource set that indicates an order of alternative DTIs. Presenting the first prompt for the first DTI includes providing a user interface associated with the first prompt to which the user can input the non-verbal response. Updating the state of the dialog includes annotating the corresponding DTI with the received non-verbal response.

Particular embodiments of the subject matter described in this specification can be implemented so as to realize one or more of the following advantages. A user can respond to dialog questions with both voice responses and non-verbal inputs. The state of a dialog can be maintained locally on a user device during execution and updated for non-verbal responses. The state information is sent as a bundle to a dialog system to update the state of the dialog. Maintaining the state locally for non-verbal responses reduces the latency and number of data transmissions to and from the dialog system. In addition, the size of data transmissions can be reduced during the dialog process. In some implementations, maintaining and calculating the state locally instead of at the dialog system can maintain state data about private data, e.g., contact information, without actually sending the data to the dialog system. Maintaining state locally is also useful in maintaining consistency in the dialog when the user's dialog system access may change during the dialog, for example, by moving between cell towers while driving.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Users can provide voice instructions to a device to perform a particular task, for example, generating a calendar item, place a call or text, or search for particular information. Performing the task, by the device or by a system in communication with the device, can be driven by a conversational dialog that asks the user questions for one or more values needed to complete the task, analogous to filling out fields of a form.

For example, a sample dialog for a calendar task can be:
User: [create a meeting with Dave]
Device/system: What day?
User/system: [tomorrow]
Device/system: What time?
User: [Three O'clock]
Device/system: I've generated a meeting with Dave for tomorrow at 3:00.

In some implementations, a given dialog is multimodal such that a user can provide a combination of speech and one or more manual non-verbal inputs in response to a dialog question. A visual user interface can be presented to a user of a user device that is correlated with the spoken questions presented from the dialog. For example, a sample dialog for a calendar task can be:
User: [create a meeting with Dave]
Device/system: What day?
*User manually enters a date for tomorrow, e.g., using a touch input*
Device/system: What time?
User: [Three O'clock]
Device/system: I've generated a meeting with Dave for tomorrow at 3:00.

One or more questions of the dialog can be answered with non-verbal interactions to the user device, for example, using a touchscreen, mouse, keyboard, or other suitable input. The voice commands and the non-verbal commands may overlap but are not necessarily the same. For example, a user can cancel a command with the voice input [cancel] or by a particular swiping motion in the presented user interface. However, there may not be a voice command equivalent for every possible non-verbal input to the user interface.

The dialog has a particular state identifying the current position in the dialog. In some implementations, this state is maintained on a system that processes the received voice inputs. For example, the user device can transmit voice inputs from the user to a system, e.g., using one or more networks. The system can process the voice input to recognize the received command and update the dialog. Thus, the state can be updated with receipt of the voice input. However, non-verbal interactions with the user interface are executed locally on the user device and may not be immediately provided to the server. This specification describes techniques for managing a multimodal dialog that receives both voice and non-verbal inputs to a dialog.

Figure 1:
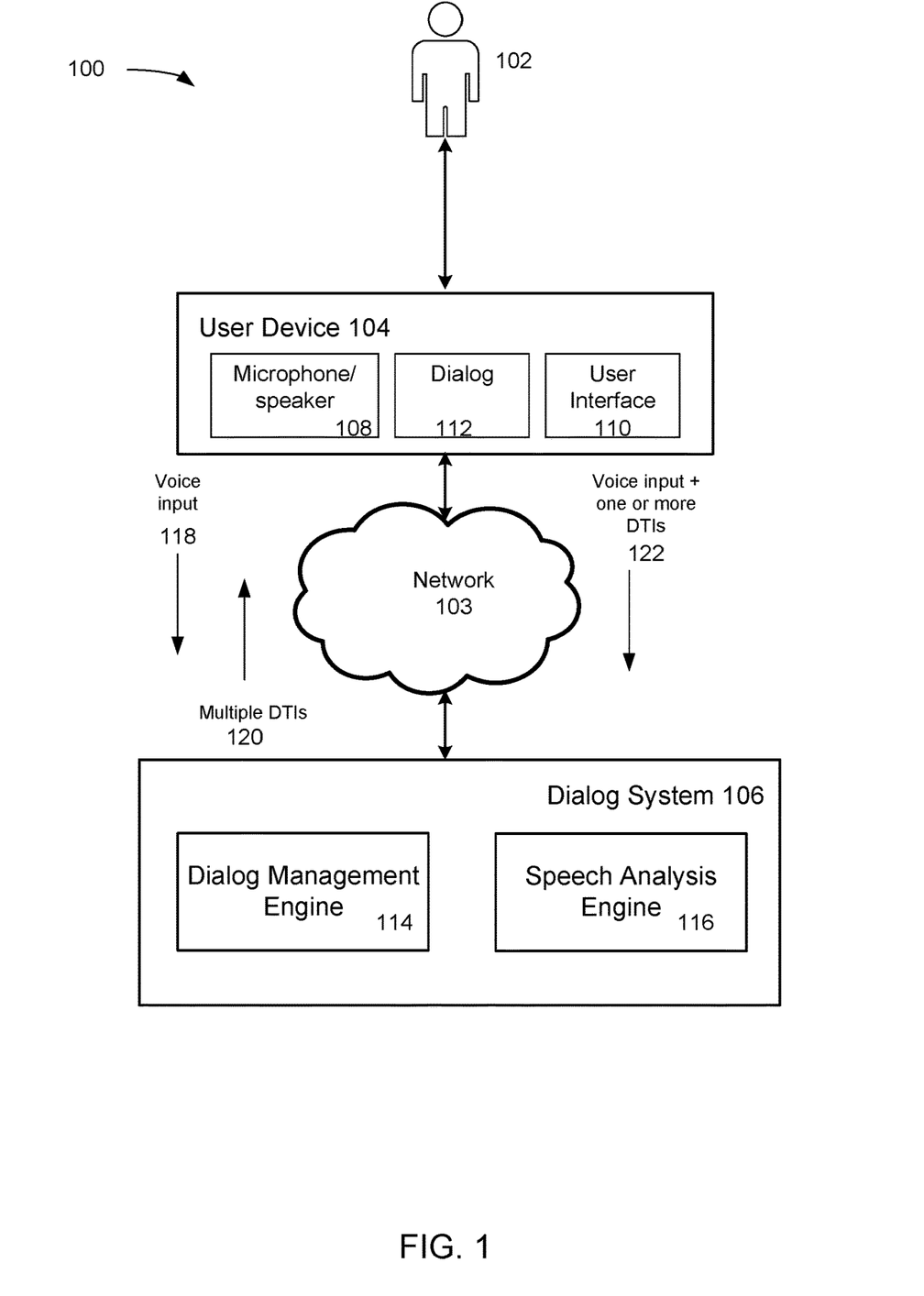
FIG. 1 is an example system for managing a multimodal dialog.

FIG. 1 is an example system 100 for managing a multimodal dialog. The system 100 includes a user 102, a user device 104, and a dialog system 106. The user device 104 and the dialog system 106 care in communication though a network 103, e.g., the internet.

The user device 104 can be one of a number of suitable devices including a mobile device, a wearable computer, a tablet, a hybrid, a laptop, or desktop computer. The user device 104 receives interactions, both verbal, e.g., voice inputs, and non-verbal from the user 102. In particular, the user device 104 includes a microphone 108 configured to receive voice inputs from the user 102. The user device 104 can also include one or more speakers configured to broadcast dialog questions in response to received user request. Only a single user device is shown for clarity. However, there can be many user devices associated with corresponding distinct users. Each of these user devices can be in communication with the dialog system 106 through the network 103.

The user device further includes a user interface 110. The user interface 110 can present information to the user including some or all of content associated with a dialog in response to a user request. The dialog 112 defines a number of questions for values needed to perform a task requested by the user. In some implementations, the dialog is governed by a frame generated for the task. Particular questions or other content of the dialog 112 can be presented to the user in a particular order, for example, though a sequence of audio questions broadcast by the one or more speakers or displayed in the user interface 110. The dialog 112 also maintains a local state of the dialog. This refers to the current location in the dialog, e.g., which question is being asked of the user 102. This may or may not match the state of the dialog maintained on the dialog system 106, as discussed in greater detail below.

The dialog system 106 can be one or more computing resources, e.g., one or more computing systems, or virtual machines executing on one or more computing systems, in communication with the user device 104 through the network 103. The dialog system 106 includes a dialog management engine 114 and a speech analysis engine 116.

The speech analysis engine 116 can use a suitable speech-to-text process is used to convert the received voice inputs 118 into a text string. The speech analysis engine 116 can also parse the audio to identify one or more meanings, e.g., by generating a parse tree. The meaning of the audio can be used to identify a particular task to perform in response to a received request as well as determining the meaning of answer to particular dialog questions for the task.

The dialog management engine 114 manages one or more dialogs associated with a requested task. This includes maintaining a state of the dialog, e.g., what question is being answered, so that the speech analysis engine 116 can properly interpret received audio associated with the dialog. In particular, the accuracy of the speech analysis engine 116 in correctly interpreting the received audio can be improved by knowing what type of response is asked of the user 102. Otherwise, the speech analysis engine 116 may interpret the received speech as unrelated to the dialog, in which case an error response can be returned, or a request for a new task, e.g., a search based on the content of the received speech.

To maintain the state, the dialog management engine 114 provides a data structure that encodes what question in the dialog is being asked of the user 102 as well as the type of information the dialog system 106 is requesting from the user 102 in response. In some implementations, this information is encoded in a protocol buffer referred to in this specification as a DialogTurnIntent ("DTI"). For convenience, DTI will be used throughout, but other suitable encoded data structures can be used.

For example, in a dialog for a task of composing an e-mail message, one question of the dialog can be a request for a subject of the e-mail. The dialog management engine 114 can create a DTI where the question to the user is a prompt for a subject. The DTI is sent to the user device 104 where it can be presented to the user 102, for example, as a visual question in the user interface, e.g., "What is the subject?" or as an audio question emitted from the speakers e.g., "What would you like the subject to be?"

The dialog management engine 114 can send 120 more than one DTI to the user device 102. In particular, the DTIs can include not only the current prompt to the user, but other DTIs related to other fields necessary to complete the dialog for the requested task. For example, when the dialog management engine 114 sends the "prompt for subject" DTI it can also send a DTI for a subsequent question in the dialog, e.g., a "prompt for message body" DTI as an alternative DTI.

In some implementations, an encapsulation sent by the dialog system 106 to the user device 104 including DTIs for filling out a form (e.g., the visual interface presented to the user 102 with fields to fill in) is represented as follows:

```
Response {
    [Audio File Of Prompt To Play]
    [Current Form And Contents To Render (field names and contents, like "Recipient" and "John Smith" respectively]
    DialogTurnIntent {
        [Current state of the dialog, with data not otherwise contained the "Current Form and Contents To Render"]
        [Possible state of the dialog, to visit if the user engages in some touch interaction]
    }
}
```

The user device 104 does not immediately present one of the one or more alternative DTI prompts to the user 102. Instead, whether or not an alternative DTI prompt is presented depends on the local state of the dialog 112 at the user device 104. In particular, if a user 102 answers the first DTI, e.g., "prompt for subject" DTI, using a non-verbal input, the local state of the dialog is updated to the next field of the dialog and the alternative DTI prompt can be presented. Because the alternative DTI was provided with the first DTI, the alternative DTI is presented without a roundtrip message path to the dialog system 106.

Whenever the user 102 provides a voice input in response to a dialog question, the corresponding one or more DTIs are returned to the dialog system 106 with the voice input 122. The DTI is annotated with the user responses and the manner of the responses, e.g., voice vs. non-verbal. The dialog management engine 114 can therefore update the state of the dialog to the current question being answered by the voice input and inform the speech analysis engine 116 of the question being answered so that speech analysis engine 116 can properly interpret the speech input and provide an appropriate response. The dialog management engine 114 can generate additional DTIs to send to the user device 104 as needed.

In some implementations, the encapsulation of the content send to the dialog system 106 in response to the user voice input is represented as follows:

```
Request {
    [Audio File of User Input]
    [Current Form And Contents, Including Latest Touch Input]
    DialogTurnIntents {
        [State of the dialog that was visited due to touch interaction, if any]
        ["Current" state of the dialog as provided by the Response]
    }
}
```

If the user doesn't engage in any touch interaction then the user device 104 will only echo back the "Current" state (the last state known to the dialog system 106) and not the "Possible" states not visited. The audio prompts sent to the user device as well as the audio of the voice inputs from the user are not part of the DTIs themselves. However, in some other implementations, the DTIs can include additional content, for example, the form itself, particular fields of the dialog, etc.

The dialog 112 on the user device 104 can save each DTI answered using non-verbal input so that if the user 102 later issues a voice response the user device 104 can send a bundle of DTIs that have been answered since the last communication with the dialog system 106. The bundled DTIs provide an order to the user responses so that commands that depend on prior responses can be properly understood. For example, if the voice input is a command to "undo that" or "change it to seven" correcting a prior response, the ordered DTIs allow the dialog system 106 to determine which response the voice command is referring to.

In some implementations, the dialog system 106 provides the user device 104 with a list of DTIs in the order that the user device 104 should prompt for input to provide values for dialog fields if the user provides input by touch or other non-verbal input. The user device 104 can then bundle the DTIs in the order that have been answered by the user 102 for transmission to the dialog system 106 with the next voice response. For example, if the user 102 uses a touch input to provide an End Time for an event in response to a prompt, then uses a touch input to provide a Subject for the event, and then touches a microphone to input the next response, the bundle of DTIs sent to the dialog system 106 can include the Subject DTI, then the End Time DTI, then the "current" DTI last. The bundle of DTIs provides a list of all the states the user visited since the dialog system was last consulted, with most recent states first, ending with the most recent state that the dialog system knows about. The ordering helps the system correctly interpret the user's input.

In some implementations, only a specified number of alternative DTIs is sent at a time to the user device 102. This can be described by a ResourceSet sent to the user device, for example, as follows:

```
ResourceSet {
    optional FormattedValue display_prompt = 1;
    optional FormattedValue vocalized_prompt = 2;
    optional UserTurnFeature presented_user_turn_feature = 3;
}
```

Sending only a specified number of DTIs allows for greater control of the amount of data being sent at a time as well as sending only the DTI that are immediately needed to continue the dialog after a non-verbal response.

In some other implementations, DTIs for the entire dialog are sent to the user device 102. This can be described by a ResourceSet sent to the user device, for example, as follows:

```
ResourceSet {
    optional FormattedValue display_prompt = 1;
    optional FormattedValue vocalized_prompt = 2;
    optional DialogTurnIntent presented_dialog_turn_intent = 3;
}
```

Sending the entire accumulated DTIs since the last transmission to the dialog system allows more flexibility on the client side to continue the dialog particularly in response to more than one non-verbal response.

Figure 2:
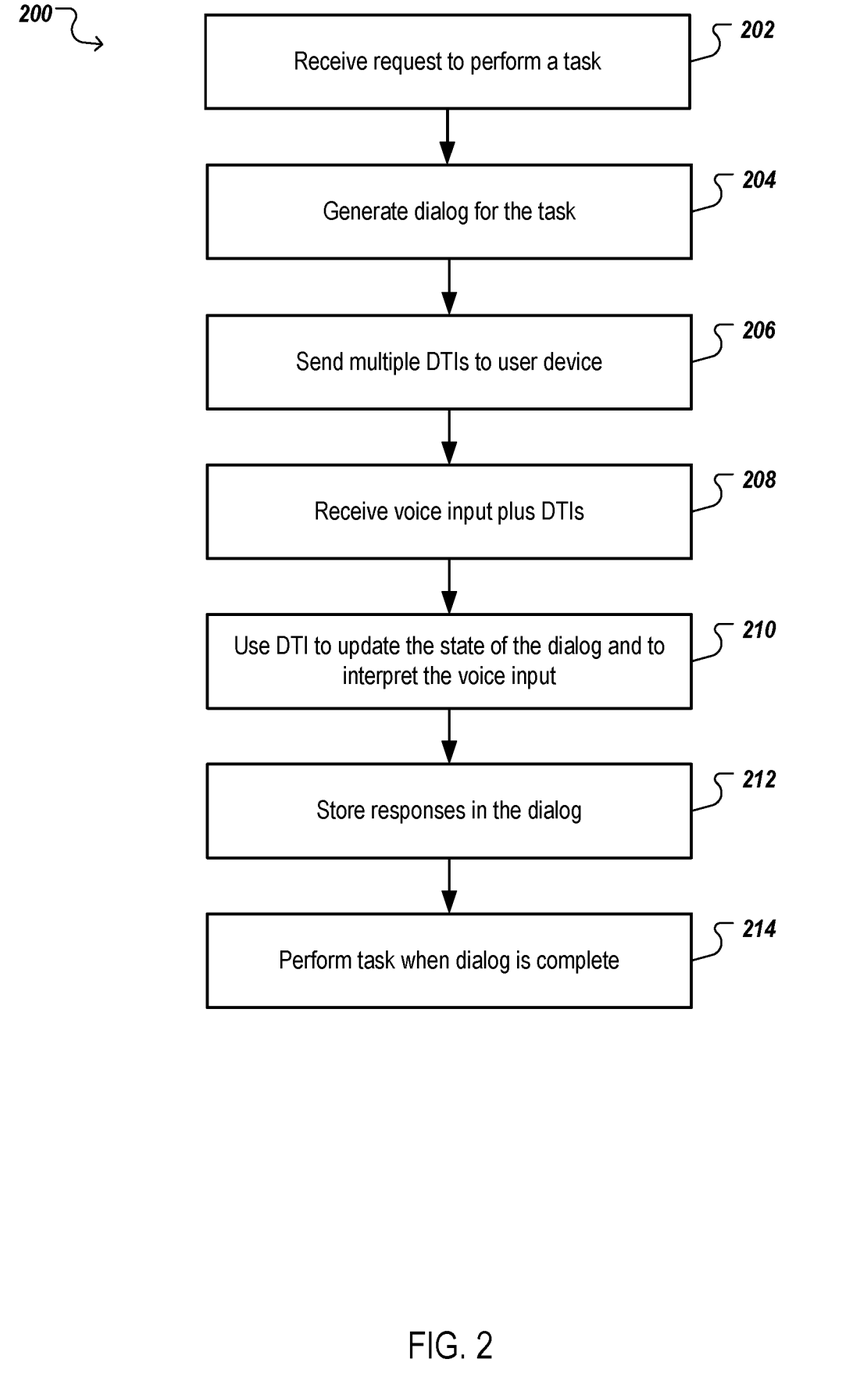
FIG. 2 is a flowchart of an example process for managing a multimodal dialog.

FIG. 2 is a flowchart of an example process 200 for managing a multimodal dialog. For convenience, the process 200 will be described as being performed by a system of one or more computers, located in one or more locations, and programmed appropriately in accordance with this specification. For example, a dialog system, e.g., the dialog system 106 of FIG. 1, appropriately programmed, can perform the process 200.

The system receives a request to perform a task (202). The request can be received as a voice input provided by a user to a user device or a manual input to the user device, e.g., user device 104 of FIG. 1. The task can be, for example, generating a calendar item, generating an e-mail, placing a call or text, or search for particular information.

The system processed the request and generates a dialog for the corresponding task (202). For a voice request, the system can process the voice input to determine the meaning of the input, e.g., parsing the audio to identify a particular request. The system then obtains a dialog that corresponds to the task, e.g., from a repository of task specific dialogs or generated from a template. The dialog provides a structure for determining a number of values needed to complete the task. For example, a calendar meeting task can include fields for a person to invite, a date, a time, and a place for the meeting. The values for these are requested according to the dialog. In particular, DTIs can be generated that request values according to a particular order.

The system sends multiple DTIs to the user device (206). The DTIs can be encoded in a data structure that identifies an order to the DTIs, for example, a primary DTI and one or more alternative DTIs having an order according to the dialog for the task. A prompt associated with a particular alternative DTI can be presented to the user in response to a non-verbal user input responding to the immediately preceding DTI in the order.

The system receives a voice input plus one or more DTIs from the user device (208). The one or more DTIs identify dialog prompts that the user responded to prior to the current DTI associated with the voice input. Thus, the DTIs provide a record of the current state of the dialog including the responses received to earlier prompts as well as the order and mode in which the responses were received by the user device.

The system uses the DTIs to update the state of the dialog and to interpret the voice input (210). For example, the DTIs are used to update the state of the dialog at the system so that the system can determine a next portion of the dialog to receive responses to, or alternatively, a next set of DTIs to send to the user device. Additionally, the updated state provides context to the analysis of the voice input such that it can be properly interpreted. This includes the order of responses to the DTIs for interpreting voice responses that refer to prior responses.

The system stores responses in the dialog (212). For each completed DTI, including the analyzed voice input, the resulting values can be stored in the dialog. The system can determine whether there are additional values needed or whether the dialog is complete. If there are additional values needed one or more additional DTIs may be sent to the user device or the system may wait for additional responses from the user device. If there are no additional values needed, the system can complete the task, for example, by generating a calendar entry or e-mail message (214). The completed task can be sent to the user device for approval before being executed or can be automatically performed.

Figure 3:
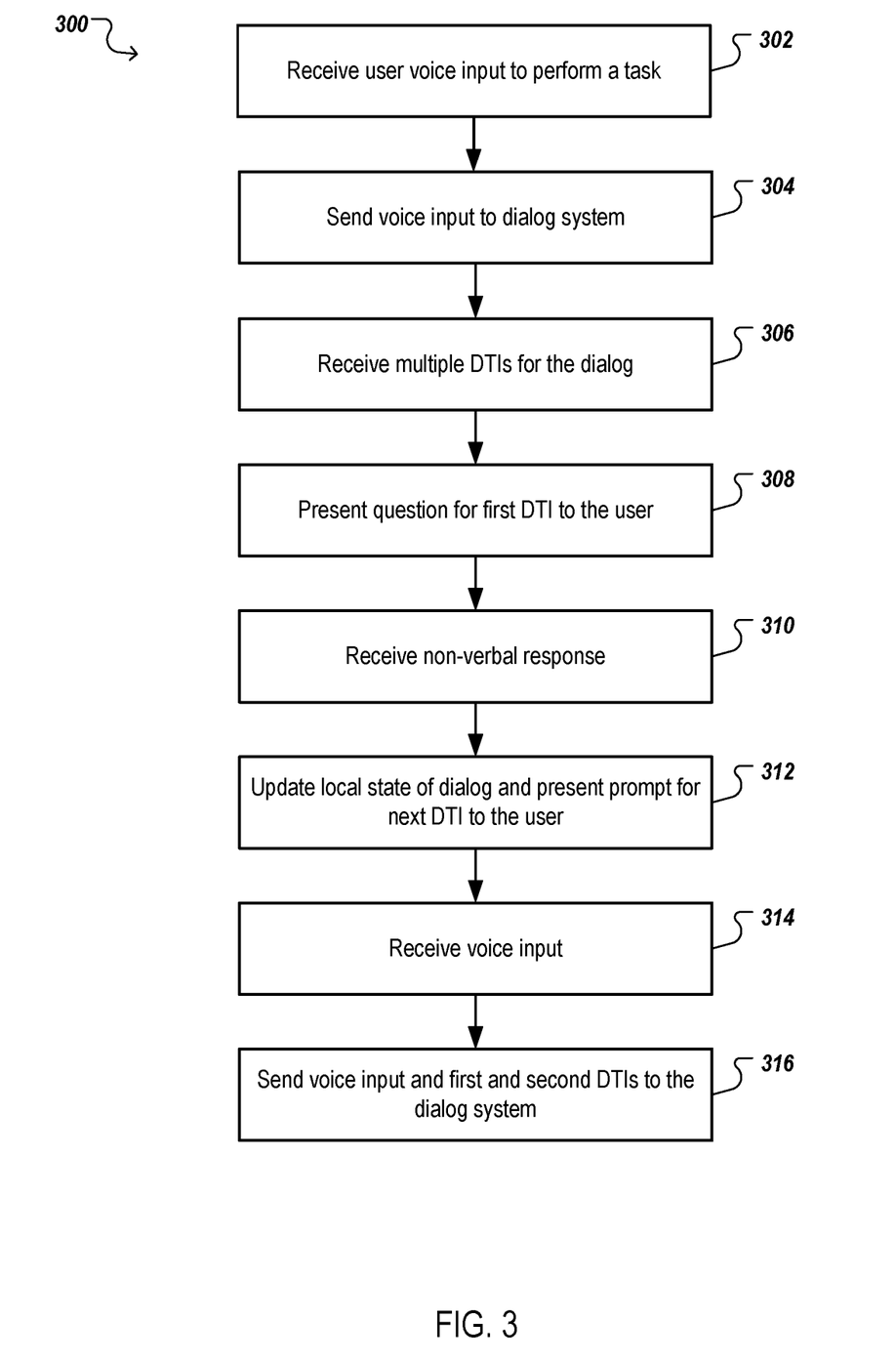
FIG. 3 is a flowchart of an example process for managing a multimodal dialog.

FIG. 3 is a flowchart of an example process 300 for managing a multimodal dialog. For convenience, the process 300 will be described as being performed by a device and programmed appropriately in accordance with this specification. For example, a user device, e.g., the user device 104 of FIG. 1, appropriately programmed, can perform the process 300.

The device receives a user voice input to perform a task (302). The input can be received for example, in response to a user voice command spoken to the device and captured by a microphone on the device. In some implementations, the user provides an input to the device indicating that they are going to submit a voice command, e.g., by selecting a particular user interface element.

The device sends the voice input to a dialog system (304), e.g., dialog system 106 of FIG. 1. In some implementations, the device can parse the audio of the voice input to identify one or more meanings, e.g., by generating a parse tree, and provide the parsed audio as the request to the dialog system. Alternatively, the device can provide the voice input to the dialog system, and the dialog system can parse the audio to identify the request. The request identifies the task, e.g., generate a calendar event, generate a reminder, provide information to the user, and so on.

The device receives multiple DTIs for the dialog (306). The DTIs can be encoded in a data structure that identifies an order to the DTIs, for example, a primary DTI and one or more alternative DTIs having an order according to the dialog for the task.

The device presents a dialog prompt for a first DTI to the user (308). The prompt is a particular question designed to elicit a response corresponding to a needed value of the dialog. For example, when generating an e-mail message, the first DTI may prompt the user to provide a subject of the e-mail message with a question such as "what is the subject?" The prompt can be presented in a user interface or as an audio output form the device.

The device receives a non-verbal response to the first DTI (310). The non-verbal response to the device, for example, can be provided using a touchscreen, mouse, keyboard, or other suitable input. For example, the user can type in a subject for the e-mail instead of providing a voice response.

The device updates the local state of the dialog and presents a dialog prompt for the next DTI to the user (312). The device stores the reply and identifies the next DTI in the dialog without sending data about the received reply to the dialog system.

The device receive a voice response to the next DTI (314). The device then provides the voice response to the dialog system along with the preceding DTIs answered since the last voice input was sent to the dialog system (316). Each of the DTIs include their respective responses and the mode of response. While in this example, there is only one prior DTI (the first DTI), there may be several DTI prompts presented and answered by the user before a voice input is received. These can be bundled together and sent with the voice response to the dialog system.

If the device has additional DTIs available for prompting the user, the device presents the prompt for the next DTI to the user. If there are no additional DTIs available, the device can wait for a response from the dialog system. The response from the dialog system can include additional DTIs for the dialog or an indication of a completed task. In some implementations, the device presents a summary of the completed task values to the user, e.g., a draft e-mail or calendar entry, for confirmation before the task is executed.

In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving a request from a user device to perform a task;
   obtaining a multimodal dialog corresponding to the task, wherein the multimodal dialog includes questions that can be responded to with a combination of voice and non-voice inputs;
   providing a sequence of ordered protocol buffers associated with the multimodal dialog to the user device, wherein each protocol buffer includes information about a question of the multimodal dialog;
   receiving a bundle of two or more annotated protocol buffers from the user device representing a local state of the multimodal dialog on the user device, the bundle of two or more annotated protocol buffers including a voice annotated protocol buffer identifying a voice input response to a question of the multimodal dialog and one or more non-voice annotated protocol buffers identifying non-voice responses to corresponding questions of the multimodal dialog that preceded the question of the multimodal dialog resulting in the voice input response; and
   using the bundle of two or more annotated protocol buffers to update a state of the multimodal dialog and to interpret the voice annotated protocol buffer.

2. The method of claim 1, wherein each protocol buffer is a DialogTurnIntent (DTI).

3. The method of claim 1, comprising: providing one or more additional protocol buffers to the user device in response to updating the state of the multimodal dialog following the voice input.

4. The method of claim 1, wherein the sequence of the ordered protocol buffers encompass the entire multimodal dialog for the task.

5. The method of claim 1, comprising: completing the task once values for the multimodal dialog are determined based on user inputs responsive to questions provided by the sequence of the ordered protocol buffers.

6. The method of claim 5, wherein completing the task includes providing a calendar item generated using the values of the multimodal dialog.

7. The method of claim 1, wherein the multimodal dialog indicates particular values needed to complete the task and the state of the multimodal dialog identifies a current position in the multimodal dialog.

8. A method comprising:
   receiving a user input at a user device to perform a task;
   providing the user input to a dialog system to generate a dialog;
   receiving multiple protocol buffers for the dialog, wherein each protocol buffer includes information about a question of the dialog;
   presenting a first prompt for a first protocol buffer to a user;
   receiving a non-verbal response to the first prompt;
   updating a local state of the dialog at the user device with the non-verbal response including annotating the first protocol buffer identifying the non-voice response and presenting a second prompt for a second protocol buffer to the user;
   receiving a voice input in response to the second prompt; and
   in response to receiving the voice input, updating the local state of the dialog with the verbal response including annotating the second protocol buffer identifying the voice response and providing the voice input and a bundle of both the first and second annotated protocol buffers to the dialog system.

9. The method of claim 8, wherein the multiple protocol buffers are received as part of a resource set that indicates an order of alternative protocol buffers.

10. The method of claim 8, wherein presenting the first prompt for the first protocol buffer includes providing a user interface associated with the first prompt to which the user can input the non-verbal response.

11. The method of claim 8, wherein updating the local state of the dialog includes annotating the corresponding protocol buffer with the received non-verbal response.

12. The method of claim 8, wherein the user input to perform a task is a user input to generate a calendar item.

13. The method of claim 8, further comprising:
receiving a calendar item that includes values populated using the received voice input and non-verbal response.

14. The method of claim 8, further comprising:
receiving one or more additional protocol buffers for the dialog from the dialog system; and
presenting a first prompt for a first additional protocol buffer to the user.

15. A system comprising:
one or more computers and one or more storage devices storing instructions that are operable, when executed by the one or more computers, to cause the one or more computers to perform operations comprising:
receiving a request from a user device to perform a task;
obtaining a multimodal dialog corresponding to the task, wherein the multimodal dialog includes questions that can be responded to with a combination of voice and non-voice inputs;
providing a sequence of ordered protocol buffers associated with the multimodal dialog to the user device, wherein each protocol buffer includes information about a question of the multimodal dialog;
receiving a bundle of two or more annotated protocol buffers from the user device representing a local state of the multimodal dialog on the user device, the bundle of two or more annotated protocol buffers including a voice annotated protocol buffer identifying a voice input response to a question of the multimodal dialog and one or more non-voice annotated protocol buffers identifying non-voice responses to corresponding questions of the multimodal dialog that preceded the question of the multimodal dialog resulting in the voice input response; and
using the bundle of two or more annotated protocol buffers to update a state of the multimodal dialog and to interpret the voice annotated protocol buffer.

16. The system of claim 15, wherein the instructions are further operable, when executed by the one or more computers, to cause the one or more computers to perform operations comprising: completing the task once values for the multimodal dialog are determined based on user inputs responsive to questions provided by the sequence of the ordered protocol buffers.

17. The system of claim 15, wherein the multimodal dialog indicates particular values needed to complete the task and the state of the multimodal dialog identifies a current position in the multimodal dialog.

18. A system comprising:
one or more computers and one or more storage devices storing instructions that are operable, when executed by the one or more computers, to cause the one or more computers to perform operations comprising:
receiving a user input at a user device to perform a task;
providing the user input to a dialog system to generate a dialog;
receiving multiple protocol buffers for the dialog, wherein each protocol buffer includes information about a question of the dialog;
presenting a first prompt for a first protocol buffer to a user;
receiving a non-verbal response to the first prompt;
updating a state of the dialog with the non-verbal response including annotating the first protocol buffer identifying the non-voice response and presenting a second prompt for a second protocol buffer to the user;
receiving a voice input in response to the second prompt; and
in response to receiving the voice input, updating the local state of the dialog with the verbal response including annotating the second protocol buffer identifying the voice response and providing the voice input and a bundle of both the first and second annotated protocol buffers to the dialog system.

19. The system of claim 18, wherein the multiple protocol buffers are received as part of a resource set that indicates an order of alternative protocol buffers.

20. The system of claim 18, wherein presenting the first prompt for the first protocol buffer includes providing a user interface associated with the first prompt to which the user can input the non-verbal response.

\* \* \* \* \*

UNITED STATES PATENT AND TRADEMARK OFFICE
CERTIFICATE OF CORRECTION

PATENT NO. : 10,713,005 B2
APPLICATION NO. : 14/988494
DATED : July 14, 2020
INVENTOR(S) : Yehoshua et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this
Thirteenth Day of December, 2022

Katherine Kelly Vidal
*Director of the United States Patent and Trademark Office*